(No Model.)
E. THEISEN.
APPARATUS FOR CONDENSING OR EVAPORATING AND REFRIGERATING FLUIDS.
No. 538,557. Patented Apr. 30, 1895.
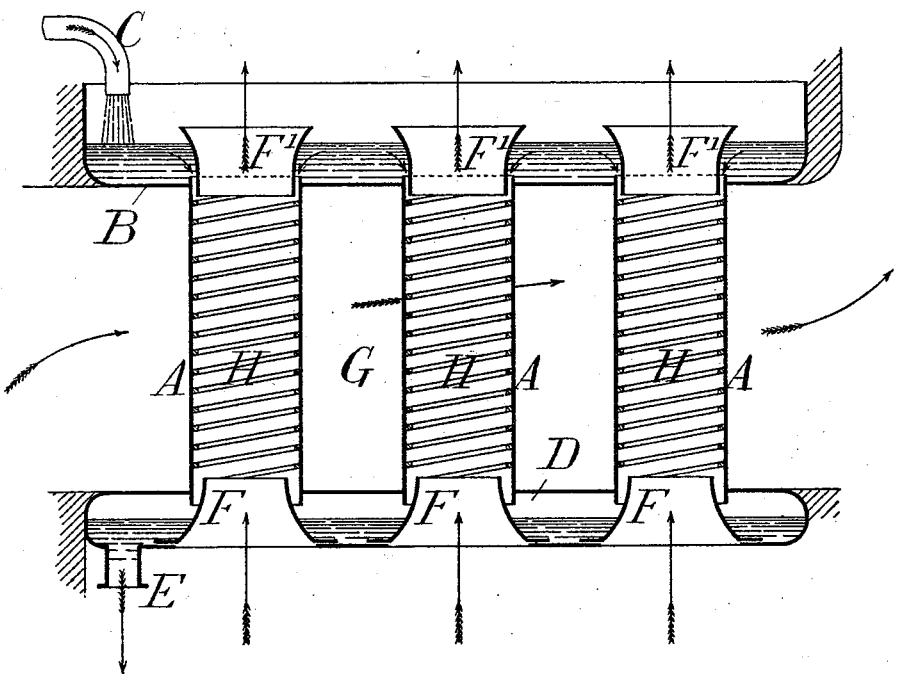

UNITED STATES PATENT OFFICE.

EDUARD THEISEN, OF BADEN-BADEN, GERMANY.

APPARATUS FOR CONDENSING OR EVAPORATING AND REFRIGERATING FLUIDS.

SPECIFICATION forming part of Letters Patent No. 538,557, dated April 30, 1895.

Application filed November 13, 1894. Serial No. 528,677. (No model.) Patented in Germany April 22, 1894, No. 78,998; in Belgium July 13, 1894, No. 110,966; in Hungary July 31, 1894, No. 859, and in Austria September 15, 1894, No. 44/4,829.

*To all whom it may concern:*

Be it known that I, EDUARD THEISEN, a citizen of the United States, residing at 15 Werderstrasse, Baden-Baden, in the Empire of Germany, have invented certain new and useful Improvements in Apparatus for Condensing or Evaporating and Refrigerating Fluids, (for which I have obtained Letters Patent in Belgium, dated July 13, 1894, No. 110,966; in Germany, dated April 22, 1894, No. 78,998; in Austria, dated September 15, 1894, No. 44/4,829, and in Hungary, dated July 31, 1894, No. 859,) of which the following is a specification.

My invention relates to that description of apparatus for condensing or evaporating and refrigerating fluids in which a thin film of liquid is made to flow down over the inner surfaces of tubes while hot or cold air or gases are brought in contact with such film so as to evaporate the liquid; to produce cold for effecting the condensation of steam or other condensible vapor, or the refrigeration of a liquid flowing in contact with the outer surface of the tube.

The accompanying drawing shows a vertical section of an apparatus for evaporating liquids constructed according to my above described invention, as applied to the evaporation, or concentration of a liquid.

A A are tubes, fixed at their upper ends in a tray B, supplied with the liquid to be evaporated or concentrated by the pipe C. The lower ends of the tubes are fixed in the top of a flat chamber D which receives the liquid flowing from the lower ends of the tubes, and from which such liquid flows off through the branch E. The bottom of this chamber has openings opposite the tubes A, provided with nozzles F projecting up into the lower ends of the tubes, the upper mouths of the nozzles being smaller than the inner diameter of the tubes, so as to leave an annular orifice between them for the passage of the liquid. Similar nozzles F' are fixed by distance pieces in the upper ends of the tubes A, so as to leave an annular orifice between the nozzle and the tube for the liquid to flow down from the tray B in a thin film over the inner surface of the tube. The nozzles F' are of such a height as to reach above the level of the liquid in the tray.

The space G through which the tubes A pass may either be a chamber or part of a flue through which hot gases, such as those coming from a furnace pass. The space below the chamber D is open to the atmosphere while that above the tray B is either also open to the atmosphere, or it may communicate with a flue for leading away the air charged with aqueous vapor rising from the tubes A. The internal surfaces of the tubes A are by preference provided with helically coiled wires H, such as were described in the specification to my Patent No. 496,757 for the purpose of equalizing and retarding the flow of liquid down the tubes. These may however also be used without such helical wires, or they may be formed with helical corrugations. Thus the liquid flows from the tray B in a thin film down the interior of the tubes A, and falls thence into the chamber D, while the air currents enter the tubes freely through the nozzles F, and consequently do not require to traverse the liquid falling from the tubes. The external surfaces of these being heated by the hot gases passing through the flue or chamber G, an effective upward draft is set up in the tubes, and the liquid is rapidly evaporated by coming in contact with the air currents while being at the same time heated externally by the hot gases.

It will be readily understood that the apparatus may be equally well applied to the condensation of steam or refrigeration of gases passing through the chamber G by means of the cooling effect produced by the evaporation of water or of a more or less volatile liquid flowing down the interior of the tubes.

Having thus described the nature of my invention and the best means I know for carrying it out in practice, I claim—

1. In apparatus for condensing, evaporating or refrigerating fluids the combination of tubes provided with helically coiled wires on their inner surfaces over which a liquid is made to flow, a tray or chamber at the lower ends of the tubes for receiving the liquid flowing over the inner faces of the tubes and nozzles extending upward from the lower tray into the lower ends of the said tubes for affording a free passage of air into the tubes for the purpose of evaporating the liquid flowing down them, an annular space being provided between the tube and the nozzle for the escape of the liquid substantially as described.

2. In apparatus for condensing, evaporating or refrigerating fluids, the combination of tubes down the inner surfaces of which a liquid is made to flow in a thin film from a tray or chamber to which the upper ends of the tubes are fixed, a tray or chamber at the lower ends of the tubes for receiving the liquid falling from the tubes, nozzles extending upward from the lower tray into the lower ends of the said tubes so as to leave an annular orifice between the two for the escape of the liquid, and other nozzles extending downward into the upper ends of the said tubes so as to leave an annular orifice between the two for the entrance of liquid from the upper tray into the interior of the tube, substantially as and for the purposes set forth.

In testimony whereof I have signed my name to this specification, in the presence of two subscribing witnesses, this 25th day of October, A. D. 1894.

EDUARD THEISEN.

Witnesses:
ERNEST THERIOR,
T. KLAUSMANN.